(12) United States Patent
Neumaier et al.

(10) Patent No.: US 11,187,607 B2
(45) Date of Patent: Nov. 30, 2021

(54) APPARATUS AND METHOD FOR CALIBRATING A PRESSURE SENSING DEVICE

(71) Applicant: Infineon Technologies AG, Neubiberg (DE)

(72) Inventors: Daniel Neumaier, Feldkirchen (AT); Christian Jenkner, Klagenfurt (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 281 days.

(21) Appl. No.: 16/293,052

(22) Filed: Mar. 5, 2019

(65) Prior Publication Data

US 2019/0277720 A1    Sep. 12, 2019

(30) Foreign Application Priority Data

Mar. 7, 2018    (DE) .......................... 102018203419.2

(51) Int. Cl.
*G01L 27/00*    (2006.01)
*G01L 9/12*    (2006.01)

(52) U.S. Cl.
CPC ............ *G01L 27/005* (2013.01); *G01L 9/125* (2013.01)

(58) Field of Classification Search
CPC ..... G01L 27/005; G01L 27/002; G01L 9/125; G01L 19/04

(Continued)

(56) References Cited

U.S. PATENT DOCUMENTS

2006/0118086 A1    6/2006    Schwulst et al.
2010/0198545 A1*    8/2010    Berg ....................... G01L 21/00
                                                                        702/98

(Continued)

FOREIGN PATENT DOCUMENTS

CN    102032974 A    4/2011
CN    102399447 A    4/2012

(Continued)

OTHER PUBLICATIONS

Liu, Peng, "Research of the Temperature Drift Compensation method of Piezoresistive pressure sensor", printed in magazine "Full text database of Chinese master's thesis on engineering and technology, Band 11", Feb. 15, 2012, 58 pages.

(Continued)

*Primary Examiner* — Tarun Sinha
(74) *Attorney, Agent, or Firm* — Slater Matsil, LLP

(57) ABSTRACT

An apparatus for calibrating a pressure sensing device having a pressure sensor and a temperature compensation device includes: a chamber for applying a variable temperature and a variable pressure to the pressure sensing device; a temperature regulation device for regulating the temperature in the chamber designed such that the temperature in the chamber respectively increases in a strictly monotonous manner or falls in a strictly monotonous manner during one or more time intervals; a pressure regulation device for regulating the pressure in the chamber designed such that the pressure in the chamber respectively monotonously increases or respectively monotonously falls in at least one of the time intervals during a plurality of sub-intervals of the one-time interval; a reference pressure sensor for sensing the pressure in the chamber during the time interval(s); and a data record generation device for generating corresponding data records.

26 Claims, 5 Drawing Sheets

(58) Field of Classification Search
USPC .......................................... 73/1.57, 1.71, 1.35
See application file for complete search history.

(56) References Cited

U.S. PATENT DOCUMENTS

| | | |
|---|---|---|
| 2014/0116149 A1 | 5/2014 | Diez et al. |
| 2017/0363423 A1* | 12/2017 | Dormody .................. G01S 5/02 |
| 2020/0249113 A1* | 8/2020 | Wang ...................... G01L 19/04 |

FOREIGN PATENT DOCUMENTS

| | | |
|---|---|---|
| CN | 103278269 A | 9/2013 |
| CN | 103913269 A | 7/2014 |
| CN | 105865702 A | 8/2016 |
| CN | 106610331 A | 5/2017 |
| DE | 19533505 A1 | 3/1997 |
| DE | 102004054644 A1 | 5/2006 |
| DE | 102012021413 A1 | 4/2014 |
| DE | 102015202029 A1 | 8/2016 |
| JP | 2001141592 A | 5/2001 |
| WO | 2013021399 A1 | 2/2013 |

OTHER PUBLICATIONS

Maruyama, Hisataka et al., "Long-Lifetime Measurement and Control of Local Temperature Using Functional Gel-Tool Containing Quantum dot by Color Analysis of Fluorescent Spectrum", International Symposium on Micro-NanoMechatronics and Human Science, Nov. 6-9, 2011, 4 pages.

* cited by examiner

APPARATUS AND METHOD FOR CALIBRATING A PRESSURE SENSING DEVICE

This application claims the benefit of German Application No. 102018203419.2, filed on Mar. 7, 2018, which application is hereby incorporated herein by reference.

TECHNICAL FIELD

Exemplary embodiments relate to an apparatus and a method for calibrating a pressure sensing device.

BACKGROUND

Since common pressure sensors are temperature-dependent in many cases, pressure sensing devices in many cases have a temperature compensation device in addition to the actual pressure sensor. In this case, it is conventional to calibrate each individual pressure sensor after its production.

In an apparatus for calibrating pressure sensing devices which is known from practice, a first group of pressure sensing devices is introduced into a chamber in a first step. The chamber and the first group of pressure sensing devices are then brought to a first exactly defined temperature, which generally requires a certain waiting time. Pressure values of the pressure sensing devices are now captured at different predetermined pressures, with the result that a plurality of pressure values each based on one of the predetermined pressures and on the first temperature are obtained for each pressure sensing device. After the first group of pressure sensing devices has been removed, further groups of pressure sensing devices are introduced into the chamber in succession, in which case, after a further waiting time in each case in which the pressure sensing devices in the respective group assume the first temperature, a plurality of pressure values each based on one of the predetermined pressures and on the first temperature are obtained for the pressure sensing devices in the respective further group.

In a second step, the first group of pressure sensing devices is introduced into the chamber again. The chamber and the first group of pressure sensing devices are then brought to a second exactly defined temperature, which again requires a waiting time. Pressure values of the pressure sensing devices are then captured at different predetermined pressures, with the result that a plurality of pressure values each based on one of the predetermined pressures and on the second temperature are obtained for each pressure sensing device. After the first group of pressure sensing devices has been removed, further groups of pressure sensing devices are introduced into the chamber in succession, in which case, after a further waiting time in each case in which the pressure sensing devices in the respective group assume the second temperature, a plurality of pressure values each based on one of the predetermined pressures and on the second temperature are obtained for the pressure sensing devices in the respective further group.

In a third step, the first group of pressure sensing devices is introduced into the chamber again. The chamber and the first group of pressure sensing devices are then brought to a third exactly defined temperature, which again requires a waiting time. Pressure values of the pressure sensing devices are then captured at different predetermined pressures, with the result that a plurality of pressure values each based on one of the predetermined pressures and on the third temperature are obtained for each pressure sensing device. After the first group of pressure sensing devices has been removed, further groups of pressure sensing devices are introduced into the chamber in succession, in which case, after a further waiting time in each case in which the pressure sensing devices in the respective group assume the third temperature, a plurality of pressure values each based on one of the predetermined pressures and on the third temperature are obtained for the pressure sensing devices in the respective further group.

As a result, pressure values each based on one of the three defined temperatures and on one of the predetermined pressures are thus determined for each pressure sensing device. The respective pressure sensing device can then be calibrated on the basis of these pressure values and the associated temperatures and pressures.

SUMMARY

Exemplary embodiments of the invention relate to an apparatus for calibrating a pressure sensing device having a pressure sensor and a temperature compensation device, wherein the apparatus comprises: a chamber for applying a variable temperature and a variable pressure to the pressure sensing device; a temperature regulation device for regulating the temperature in the chamber, which temperature regulation device is designed in such a manner that the temperature in the chamber respectively increases in a strictly monotonous manner or falls in a strictly monotonous manner during one or more time intervals; a pressure regulation device for regulating the pressure in the chamber, which pressure regulation device is designed in such a manner that the pressure in the chamber respectively monotonously increases or respectively monotonously falls in at least one of the time intervals during a plurality of sub-intervals of the one-time interval; a reference pressure sensor for sensing the pressure in the chamber during the time interval(s); and a data record generation device for generating data records, which data record generation device is designed in such a manner that, for a plurality of discrete times during the one of the time intervals, a data record of the data records which is based on the respective discrete time is respectively generated, said data record comprising a reference pressure value generated by the reference pressure sensor, a pressure value determined by the pressure sensor and a temperature value determined by the temperature sensor of the temperature compensation device.

The chamber may have a size such that it can accommodate an individual pressure sensing device or a group of pressure sensing devices. In the latter case, data records can be simultaneously generated for a plurality of pressure sensing devices. The chamber may have an opening which can be closed in a pressure-tight manner and makes it possible to introduce and remove an individual pressure sensing device or a group of pressure sensing devices.

The temperature regulation device may have means for heating and/or means for cooling the chamber. Furthermore, the temperature regulation device may be in the form of an open-loop control device or a closed-loop control device.

The temperature regulation device may be designed in such a manner that, in a time interval considered, the temperature in the chamber increases in a strictly monotonous manner from a minimum temperature at the beginning of the time interval to a maximum temperature at the end of the time interval. The term "increase in a strictly monotonous manner" should be understood in this case as meaning that the temperature profile in the entire time interval has a gradient of greater than zero. Furthermore, the temperature regulation device may be designed in such a manner that, in a time interval considered, the temperature in the chamber falls in a strictly monotonous manner from a maximum temperature at the beginning of the time interval to a minimum temperature at the end of the time interval. The term "fall in a strictly monotonous manner" should be understood in this case as meaning that the temperature profile in the entire time interval has a gradient of less than zero. Selecting the minimum temperature and the maximum temperature makes it possible to optimize the calibration with respect to the intended field of application of the pressure sensing device.

The pressure regulation device can be designed in such a manner that, in a sub-interval considered, the pressure in the chamber monotonously increases from a minimum pressure at the beginning of the sub-interval to a maximum pressure at the end of the time interval. The term "monotonously increase" should be understood in this case as meaning that the pressure profile in the entire sub-interval has a gradient of greater than or equal to zero. The pressure regulation device may likewise be designed in such a manner that, in a sub-interval considered, the pressure in the chamber monotonously falls from a maximum pressure at the beginning of the sub-interval to a minimum pressure at the end of the sub-interval. The term "monotonously fall" should be understood in this case as meaning that the pressure profile in the entire sub-interval has a gradient of less than or equal to zero. Selecting the minimum pressure and the maximum pressure makes it possible to optimize the calibration with respect to the intended field of application of the pressure sensing device.

A sub-interval of the time interval is understood as meaning a temporal section of the respective time interval. The pressure regulation device can be designed to generate pressures which are above the ambient pressure. The pressure regulation device may likewise be designed to generate pressures which are below the ambient pressure.

A sensor having high static accuracy and a high dynamic response can preferably be used as the reference pressure sensor, with the result that the reference pressure values generated by the reference pressure sensor have minor measurement errors.

A pressure value is understood as meaning an uncompensated measured value of the pressure generated by the pressure sensor. Furthermore, a reference pressure value is understood as meaning a measured value of the pressure generated by the reference pressure sensor. A temperature value is understood as meaning an uncompensated measured value of the temperature generated by the temperature sensor of the temperature compensation device.

Discrete times are understood as meaning times which are spaced apart in terms of time. In the exemplary embodiment of the invention, the pressure values of the pressure sensing device to be calibrated are determined in a time-controlled manner at predefined discrete times. Unlike in the previously known apparatus described at the outset, this is carried out independently of the temperature prevailing at the respective time. In order to now be able to relate the respective pressure value to the temperature prevailing at the respective time, the actual temperature prevailing at the respective time is captured as a temperature value. In order to also be able to relate the respective pressure value to the pressure prevailing at the respective time, the actual pressure prevailing at the respective time is captured as a reference pressure value. For each discrete time, it is therefore possible to determine a data record comprising a pressure value, a reference pressure value and a temperature value, wherein the pressure value, the reference pressure value and the temperature value relate to the same discrete time. It is possible to calibrate the pressure sensing device using a sufficiently large number of such data records.

After the pressure sensing device has been calibrated, influences of the temperature on the pressure values can then be computationally compensated for by the temperature compensation device, with the result that compensated measured values of the pressure can be generated.

In comparison with the previously known apparatus described at the outset, the time needed to capture the pressure values (and the associated reference variables) can be reduced by a multiple here since the waiting times described at the outset are dispensed with. In addition, the practice of repeatedly introducing and removing the respective pressure sensing device into and from the chamber is dispensed with. It is therefore only necessary to introduce the pressure sensing devices to be calibrated into the chamber once, to leave them there for the duration of the time interval and to remove them once after the time interval has expired. It has thus been shown in experiments that exemplary embodiments of the apparatus according to the invention can operate approximately eight times faster than the previously known apparatus described at the outset with three predefined steps, without hereby reducing the calibration accuracy.

In addition, the handling of the determined pressure values is simplified since all pressure values of one of the pressure sensing devices are determined without removing the pressure sensing device from the chamber in the interim. It is therefore unnecessary to combine the pressure values of the pressure sensing device from the different steps of the previously known apparatus described above. It is thus possible to dispense with reading an individual identifier stored in the pressure sensing device, as is conventional in the previously known apparatus described above.

Exemplary embodiments of the apparatus according to the invention are suitable, in particular, for calibrating integrated pressure sensing devices in which the pressure sensor and the temperature compensation device are arranged on a chip. The pressure sensor may be, in particular, a capacitive micro-electromechanical pressure sensor (capacitive MEMS pressure sensor) which is in the form of a bridge circuit, for example.

Exemplary embodiments of the apparatus according to the invention are particularly suitable for calibrating simple micro-electromechanical pressure sensors with pronounced non-linearities with respect to the temperature and the pressure since these non-linearities can be compensated for by increasing the number of captured pressure values and temperature values, which is quickly possible in exemplary embodiments of the apparatus according to the invention.

In exemplary embodiments of the invention, the data record generation device is designed in such a manner that a plurality of the discrete times are respectively provided at least during some of the sub-intervals of the one of the time intervals. This makes it possible to ensure that data records having pressures which are far apart are generated in each temperature range, with the result that non-linearities with respect to the temperature and the pressure can be compensated for in a particularly good manner.

In exemplary embodiments of the invention, the data record generation device is designed in such a manner that the discrete times are equidistant at least during the one of the time intervals. The term "equidistant" means here that successive discrete times each have the interval of time. Equidistant times can ensure that a maximum number of data records are generated in the respective time interval if the technically possible minimum interval of time is provided.

In exemplary embodiments of the invention, the temperature regulation device is designed in such a manner that the temperature in the chamber alternately increases in a strictly monotonous manner and falls in a strictly monotonous manner in successive time intervals of the time intervals. If, for example, the temperature increases from a minimum temperature to a maximum temperature in a first time interval and falls from the maximum temperature to a minimum temperature in an immediately following second time interval, the temperature does not need to be adapted between the two time intervals. The minimum duration of the intermediate time between the two time intervals is then determined only by that period which is needed to remove the pressure sensing devices which have already been measured in the first time interval and to introduce the pressure sensing devices to be measured in the second time interval.

In exemplary embodiments of the invention, the pressure regulation device is designed in such a manner that the pressure in the chamber alternately monotonously increases and monotonously falls at least during the one of the time intervals in successive sub-intervals of the sub-intervals. If, for example, the pressure increases from a minimum pressure to a maximum pressure in a first sub-interval and falls from the maximum pressure to the minimum pressure in an immediately following second sub-interval, the pressure does not need to be adapted between the two sub-intervals, with the result that the time needed to determine the pressure values falls further.

In exemplary embodiments of the invention, the apparatus has a calibration data determination device for determining calibration data for the temperature compensation device of the pressure sensing device using at least some of the data records. In this case, calibration data are those data which are needed by the temperature compensation device to carry out the desired temperature compensation. Very accurate calibration data can be generated by using the large number of available data records to determine the calibration data.

In exemplary embodiments of the invention, the calibration data comprise calibration coefficients of a calibration polynomial for the temperature compensation device of the pressure sensing device. Calibration polynomials are polynomials which can be used to calculate the actual value of the variable to be measured from measured values. In the present case, the calibration polynomial may be a polynomial which includes both the temperature values and the pressure values in a sufficiently high order. For example, the third-order pressure values and the second-order temperature values can be included in the calibration polynomial. Such a calibration polynomial can assume the following form:

$$P_{cal}(P_{sens}, T_{sens}) = c_{00} + c_{10}*P_{sens} + c_{01}*T_{sens} + c_{20}*P_{sens}^2 + c_{11}*P_{sens}*T_{sens} + c_{02}*T_{sens}^2 + c_{30}*P_{sens}^3 c_{21}*P_{sens}^2*T_{sens} + c_{12}*P_{sens}*T_{sens}^2,$$

where $P_{cal}$ is the actual value of the pressure, $P_{sens}$ is the measured pressure value, $T_{sens}$ is the measured temperature value and $c_{00}, c_{10} \ldots c_{12}$ are the calibration coefficients.

The calibration coefficients can be determined from the data records using an LMS algorithm (Least-Mean-Squares algorithm), for example. In this case:

$$C = (A^T*A)^{-1}*A^T*b$$

where A is a matrix containing the measured pressure values $P_{sens}$ and the measured temperature values $T_{sens}$ in the data records, b is a matrix containing the reference pressure values $P_{ref}$ in the data records, and C is a matrix containing the calibration coefficients $c_{00}, c_{10} \ldots c_{12}$.

In exemplary embodiments of the invention, the calibration polynomial is at least a third-order polynomial with respect to the pressure and is at least a third-order polynomial with respect to the temperature. The accuracy of the calibrated pressure sensing device can be improved by using higher-order calibration polynomials. Although it is necessary in this case to determine a greater number of data records in order to be able to determine the calibration coefficients, this can be quickly achieved using exemplary embodiments of the apparatus of the invention.

In exemplary embodiments of the invention, the calibration data determination device is designed to transmit the calibration data to the temperature compensation device of the pressure sensing device. After the calibration data have been transmitted to the temperature compensation device, the calibration operation is concluded and the pressure sensing device is ready for use.

In exemplary embodiments of the invention, the calibration data determination device is designed to test the pressure sensing device on the basis of some of the data records which are not used when determining calibration data. This makes it possible to test the calibrated pressure sensing device without the latter having to be introduced into the chamber again for the purpose of generating data records.

In exemplary embodiments of the invention, the apparatus has a first compensation device for compensating for dynamic errors of the pressure sensor in order to thus reduce dynamic errors in the pressure values in the data records. A dynamic error of the pressure sensor is understood in this case as meaning an error which is generated by a delayed response behavior of the pressure sensor. The dynamic error of the pressure sensor can be determined by measurements or simulations. If the dynamic error is known, the accuracy of the pressure values can be improved by respectively adding an additive term and/or a multiplicative term to the uncompensated pressure values. This can be expressed as follows:

$$P_{sens}' = (P_{sens} + a_p)*m_p$$

where $P_{sens}$ the originally measured pressure value, $a_p$ is the additive term, $m_p$ is the multiplicative term and $P_{sens}'$ is the corrected pressure value for the data record.

In exemplary embodiments of the invention, the apparatus has a second compensation device for compensating for dynamic errors of the temperature sensor in order to thus reduce dynamic errors in the temperature values in the data records. A dynamic error of the temperature sensor is understood in this case as meaning an error which is generated by a delayed response behavior of the temperature sensor. The dynamic error of the temperature sensor can likewise be determined by measurements or simulations. If the dynamic error is known, the accuracy of the temperature values can be improved by respectively adding an additive term and/or a multiplicative term to the uncompensated temperature values. This can be expressed as follows:

$$T_{sens}' = (T_{sens} + a_t)*m_t$$

where $T_{sens}$ is the originally measured temperature value, $a_t$ is the additive term, $m_t$ is the multiplicative term and $T_{sens}'$ is the corrected temperature value for the data record.

Exemplary embodiments of the invention relate to a method for calibrating a pressure sensing device having a pressure sensor and a temperature compensation device, wherein the method comprises the following steps of: introducing the pressure sensing device into a chamber for applying a variable temperature and a variable pressure to the pressure sensing device; regulating the temperature in the chamber by a temperature regulation device, with the result that the temperature in the chamber increases in a strictly monotonous manner or falls in a strictly monotonous manner during a time interval; regulating the pressure in the chamber by a pressure regulation device, with the result that the pressure in the chamber respectively increases or respectively falls in the time interval during a plurality of sub-intervals of the time interval; sensing the pressure in the chamber during the time interval by a reference pressure sensor; and generating data records by a data record generation device, with the result that, for a plurality of discrete times during the time interval, a data record of the data records which is based on the respective discrete time is respectively generated, which data record comprises a reference pressure value generated by the reference pressure sensor, a pressure value determined by the pressure sensor and a temperature value determined by a temperature sensor of the temperature compensation device.

Exemplary embodiments of the invention relate to a computer program for carrying out a method described above when it is executed on a computer or a processor. The computer program may be stored in a non-volatile memory and may be in the form of a computer program product.

BRIEF DESCRIPTION OF THE DRAWINGS

Exemplary embodiments of the present invention are described below with reference to the accompanying figures.

DETAILED DESCRIPTION OF ILLUSTRATIVE EMBODIMENTS

In the description below, identical or equivalent elements or elements having an identical or equivalent function are denoted using identical or equivalent reference signs.

The features illustrated are used to explain exemplary embodiments of the present invention in more detail. However, for experts in the field of the invention, it is clear that exemplary embodiments of the present invention can also be implemented with the omission of individual ones of the described features. In addition, features of the different exemplary embodiments described below can be combined with one another unless explicitly stated otherwise.

Figure 1:
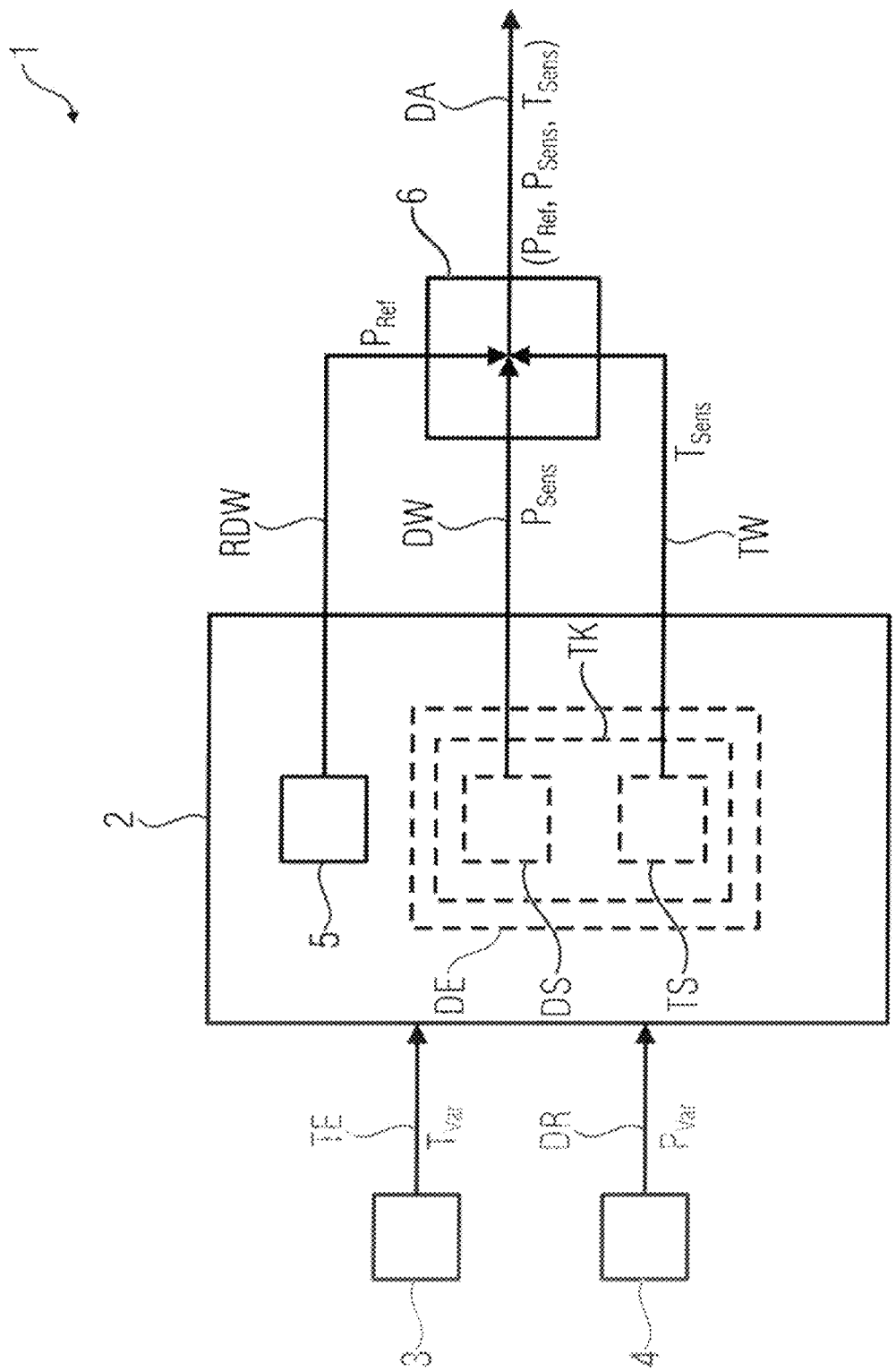
FIG. 1 shows a schematic illustration of a first exemplary embodiment of an apparatus according to the invention.

FIG. 1 shows a schematic illustration of a first exemplary embodiment of an apparatus 1 according to the invention. The apparatus 1 is provided for the purpose of calibrating and/or testing a pressure sensing device DE having a pressure sensor DS and a temperature compensation device TK.

The apparatus 1 comprises: a chamber 2 for applying a variable temperature TE and a variable pressure DR to the pressure sensing device DE; a temperature regulation device 3 for regulating the temperature TE in the chamber 2, which temperature regulation device is designed in such a manner that the temperature TE in the chamber 2 respectively increases in a strictly monotonous manner or falls in a strictly monotonous manner during one or more time intervals ZI; a pressure regulation device 4 for regulating the pressure DR in the chamber 2, which pressure regulation device is designed in such a manner that the pressure DR in the chamber 2 respectively monotonously increases or respectively monotonously falls in at least one of the time intervals ZI during a plurality of sub-intervals TI of the one-time interval ZI; a reference pressure sensor 5 for sensing the pressure DR in the chamber 2 during the time interval(s) ZI; and a data record generation device 6 for generating data records DA, which data record generation device is designed in such a manner that, for a plurality of discrete times ZP during the one of the time intervals ZI, a data record DA of the data records DA which is based on the respective discrete time ZP is respectively generated, which data record comprises a reference pressure value RDW generated by the reference pressure sensor 5, a pressure value DW determined by the pressure sensor DS and a temperature value TW determined by the temperature sensor TS of the temperature compensation device.

FIG. 1 shows, by way of example, a single pressure sensing device DE which has been introduced into the chamber 2. However, it is also possible to simultaneously introduce a plurality of pressure sensing devices DE into an appropriately dimensioned chamber 2 and to simultaneously calibrate them.

Figure 2:
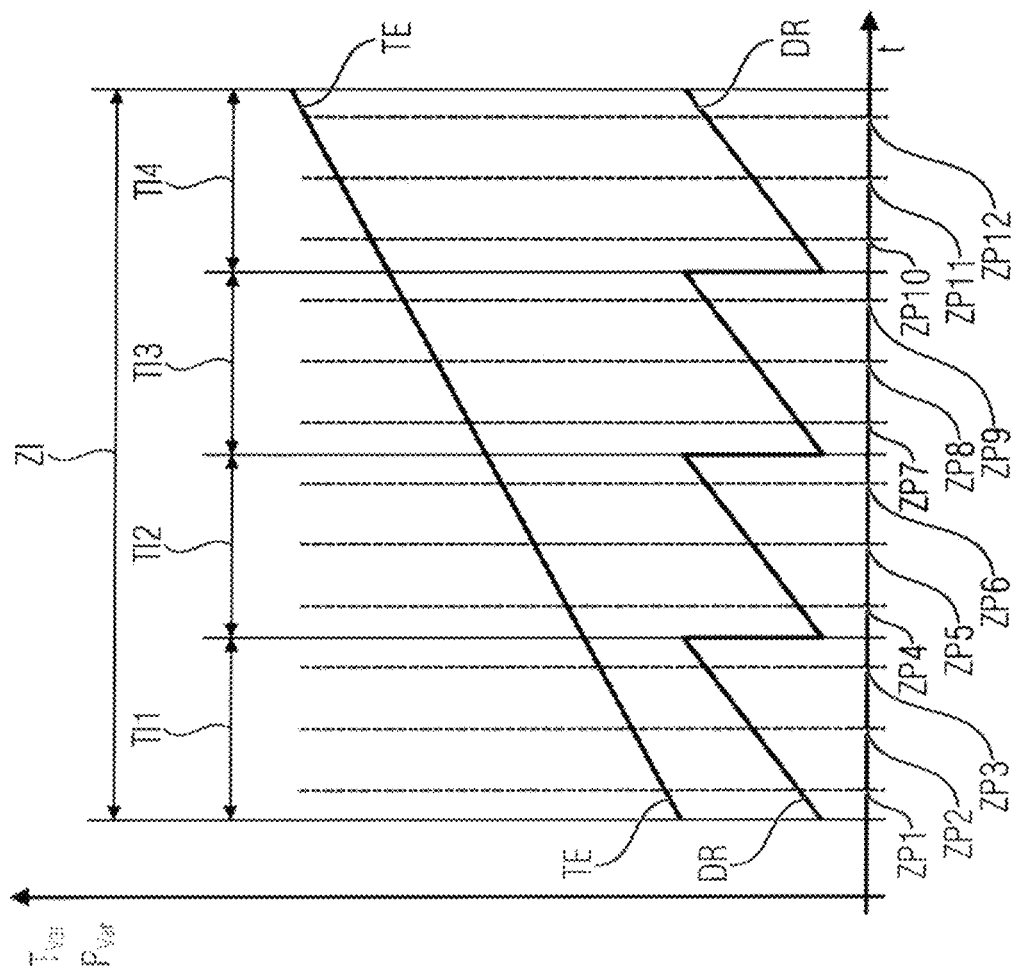
FIG. 2 shows a first exemplary graph for illustrating the method of operation of exemplary embodiments of the apparatus according to the invention.

FIG. 2 shows a first exemplary graph for illustrating the method of operation of exemplary embodiments of the apparatus 1 according to the invention. The passage of time of an exemplary time interval ZI is illustrated, wherein the temperature TE and the pressure DR in the chamber 2 are shown. The temperature TE increases in a strictly monotonous manner from the beginning of the time interval ZI to the end of the time interval ZI. The time interval ZI comprises four sub-intervals TI1, TI2, TI3 and TI4 in which the pressure DR respectively increases in a strictly monotonous manner from the beginning of the respective sub-interval TI to the end of the respective sub-interval TI. Twelve discrete times ZP1 to ZP12 at which one of the data records DA is respectively generated are provided, by way of example, in the time interval ZI. In this case, provision may be made for the pressure sensing device DE to be calibrated or the group of pressure sensing devices DE to be calibrated to be introduced into the chamber 2 before the beginning of the time interval ZI and to be removed from the chamber 2 after the end of the time interval ZI.

In exemplary embodiments of the apparatus of the invention, the data record generation device 6 is designed in such a manner that a plurality of the discrete times ZP are respectively provided at least during some of the sub-intervals TI of the one of the time intervals ZI. For example, three discrete times ZP are provided, for example, in each of the sub-intervals TI in FIG. 2, specifically the discrete times ZP1 to ZP3 in the sub-interval TI1, the discrete times ZP4 to ZP6 in the sub-interval TI2, the discrete times ZP7 to ZP9 in the sub-interval TI3 and the discrete times ZP10 to ZP12 in the sub-interval TI4.

In exemplary embodiments of the apparatus of the invention, the data record generation device 6 is designed in such a manner that the discrete times ZP are equidistant at least during the one of the time intervals ZI.

Figure 3:
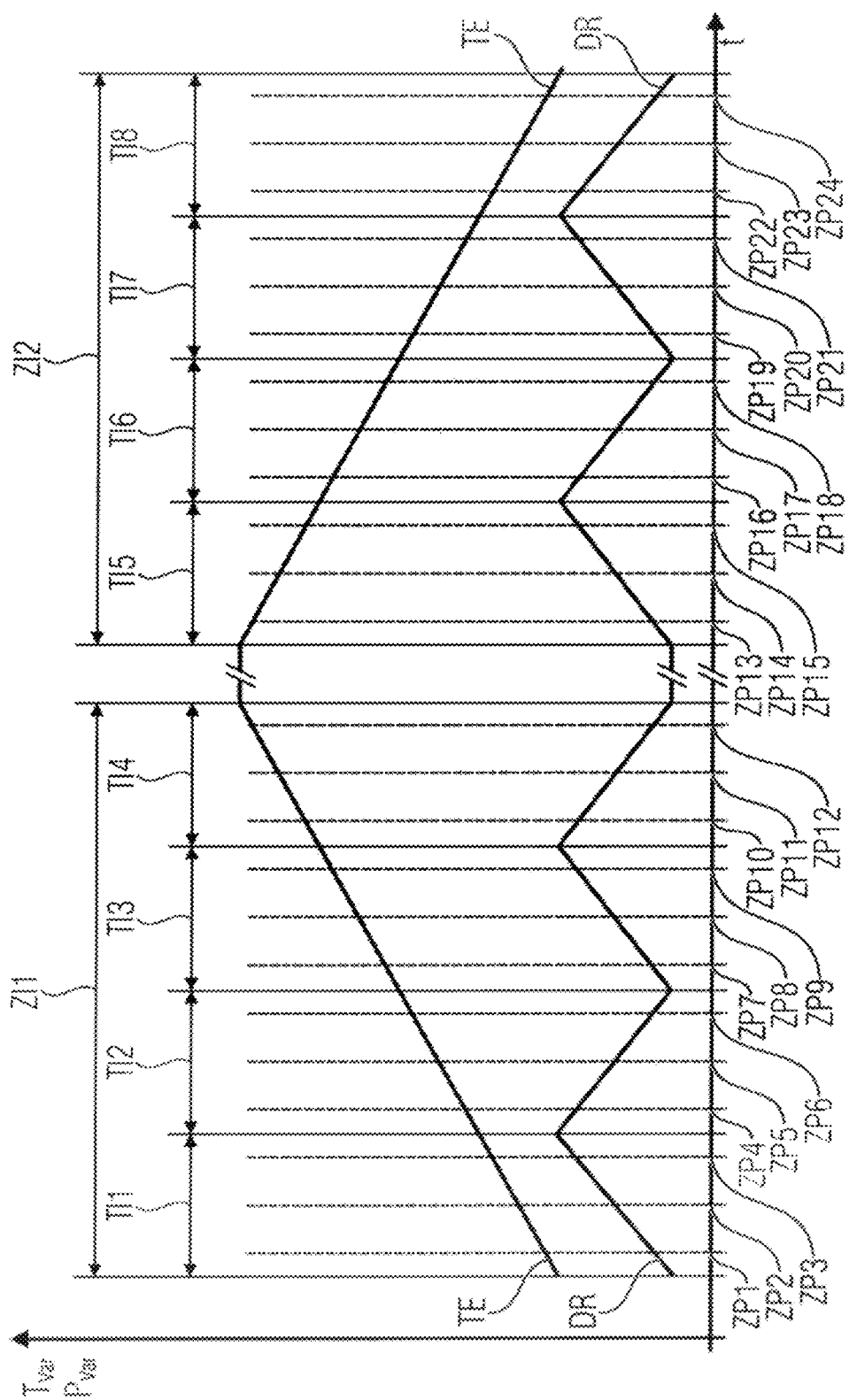
FIG. 3 shows a second exemplary graph for illustrating the method of operation of exemplary embodiments of the apparatus according to the invention.

FIG. 3 shows a second exemplary graph for illustrating the method of operation of exemplary embodiments of the apparatus 1 according to the invention. The passage of time of a first exemplary time interval ZI1 and of a second exemplary time interval ZI2 is illustrated, wherein the temperature TE and the pressure DR in the chamber 2 are shown.

The time interval ZI1 comprises four sub-intervals TI1, TI2, TI3 and TI4. In the sub-intervals TI1 and TI3, the pressure DR respectively increases in a strictly monotonous manner from the beginning of the respective sub-interval TI to the end of the respective sub-interval TI. In contrast, in the sub-intervals TI2 and TI4, the pressure DR respectively falls in a strictly monotonous manner from the beginning of the respective sub-interval TI to the end of the respective sub-interval TI. Twelve discrete times ZP1 to ZP12 at which one of the data records DA is respectively generated are provided, by way of example, in the time interval ZI. In this case, provision may be made for a first pressure sensing device DE to be calibrated or a first group of pressure sensing devices DE to be calibrated to be introduced into the chamber 2 before the beginning of the first time interval ZI1 and to be removed from the chamber 2 after the end of the time interval ZI1.

The time interval ZI2 comprises four sub-intervals TI5, TI6, TI7 and TI8. In the sub-intervals TI5 and TI7, the pressure DR respectively increases in a strictly monotonous manner from the beginning of the respective sub-interval TI to the end of the respective sub-interval TI. In contrast, in the sub-intervals TI6 and TI8, the pressure DR respectively falls in a strictly monotonous manner from the beginning of the respective sub-interval TI to the end of the respective sub-interval TI. Twelve discrete times ZP13 to ZP24 at which one of the data records DA is respectively generated are provided, by way of example, in the time interval ZI. In this case, provision may be made for a second pressure sensing device DE to be calibrated or a second group of pressure sensing devices DE to be calibrated to be introduced into the chamber 2 before the beginning of the second time interval ZI2 and to be removed from the chamber 2 after the end of the time interval ZI2.

In exemplary embodiments of the apparatus of the invention, the temperature regulation device 3 is designed in such a manner that the temperature TE in the chamber 2 alternately increases in a strictly monotonous manner and falls in a strictly monotonous manner during successive time intervals ZI of the time intervals ZI. In the example in FIG. 3, the temperature TE increases in a strictly monotonous manner from the beginning of the first time interval ZI1 to the end of the first time interval ZI1. In contrast, the temperature TE falls in a strictly monotonous manner from the beginning of the second time interval ZI2 to the end of the second time interval ZI2.

In exemplary embodiments of the apparatus of the invention, the pressure regulation device 4 is designed in such a manner that the pressure DR in the chamber 2 alternately monotonously increases and monotonously falls at least during the one of the time intervals ZI in successive sub-intervals TI of the sub-intervals TI.

In the example in FIG. 3, the pressure DR alternately increases and falls both in the sub-intervals TI1 to TI4 of the first time interval ZI1 and in the sub-intervals TI5 to TI8 of the second time interval ZI2. It therefore increases in the sub-interval TI1, falls in the time interval TI2, increases again in the sub-interval TI3, etc.

Figure 4:
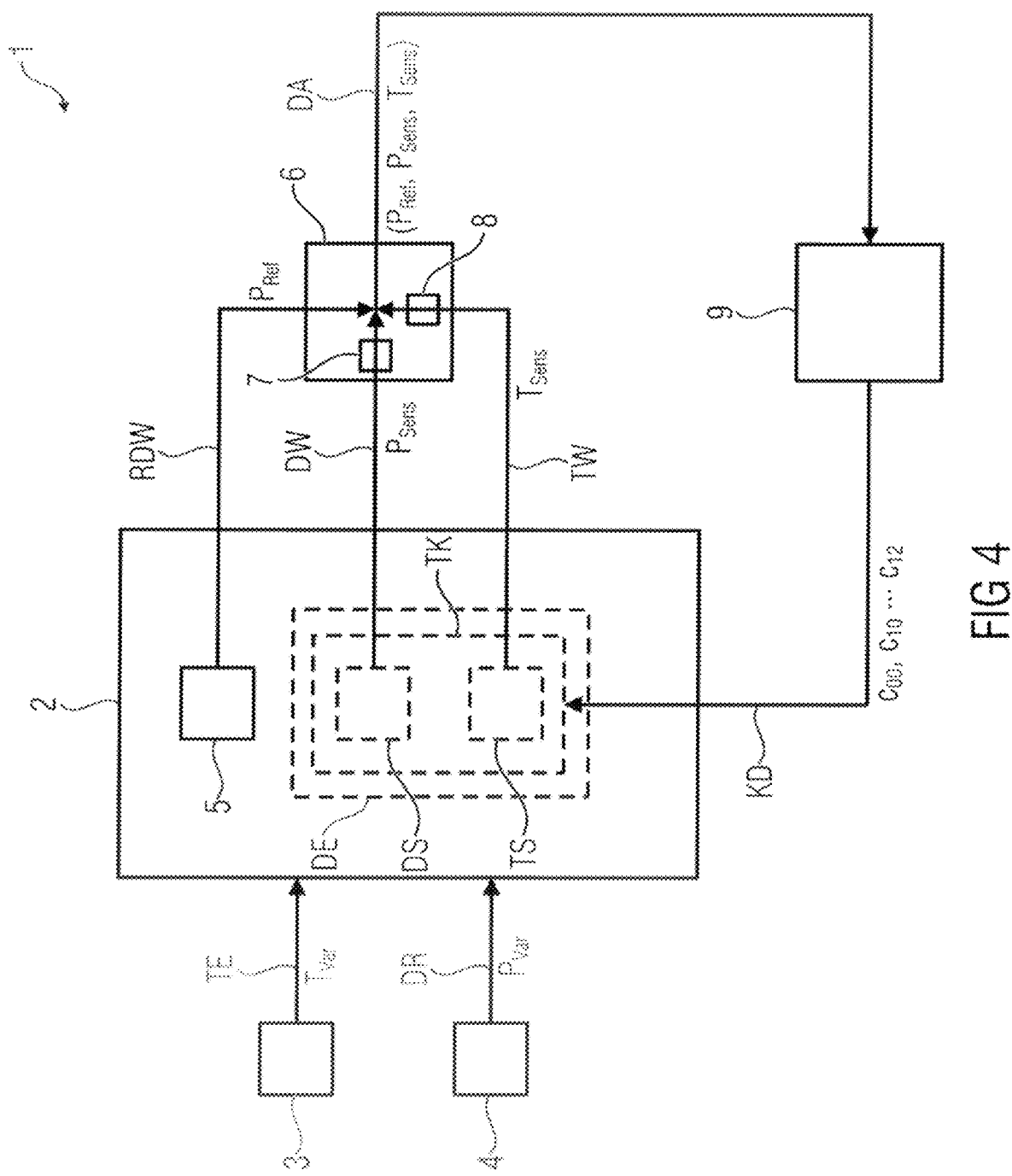
FIG. 4 shows a schematic illustration of a second exemplary embodiment of an apparatus according to the invention.

FIG. 4 shows a schematic illustration of a second exemplary embodiment of an apparatus 1 according to the invention. The exemplary embodiment in FIG. 4 is based on the exemplary embodiment in FIG. 3, with the result that only the differences are discussed below.

In exemplary embodiments of the apparatus of the invention, the apparatus has a first compensation device 7 for compensating for dynamic errors of the pressure sensor DS in order to thus reduce dynamic errors in the pressure values DW in the data records DA.

In exemplary embodiments of the apparatus of the invention, the apparatus has a second compensation device 8 for compensating for dynamic errors of the temperature sensor TS in order to thus reduce dynamic errors in the temperature values TW in the data records DA.

In exemplary embodiments of the apparatus of the invention, the apparatus has a calibration data determination device 9 for determining calibration data KD for the temperature compensation device TK of the pressure sensing device DE using at least some of the data records DA.

In exemplary embodiments of the apparatus of the invention, the calibration data KD comprise calibration coefficients of a calibration polynomial for the temperature compensation device TK of the pressure sensing device DE.

In exemplary embodiments of the apparatus of the invention, the calibration polynomial is at least a third-order polynomial with respect to the pressure DR and is at least a third-order polynomial with respect to the temperature TE.

In exemplary embodiments of the apparatus of the invention, the calibration data determination device 9 is designed to transmit the calibration data KD to the temperature compensation device TK of the pressure sensing device DE.

In exemplary embodiments of the apparatus of the invention, the calibration data determination device 9 is designed to test the pressure sensing device DE on the basis of some of the data records DA which are not used when determining calibration data KD.

Figure 5:
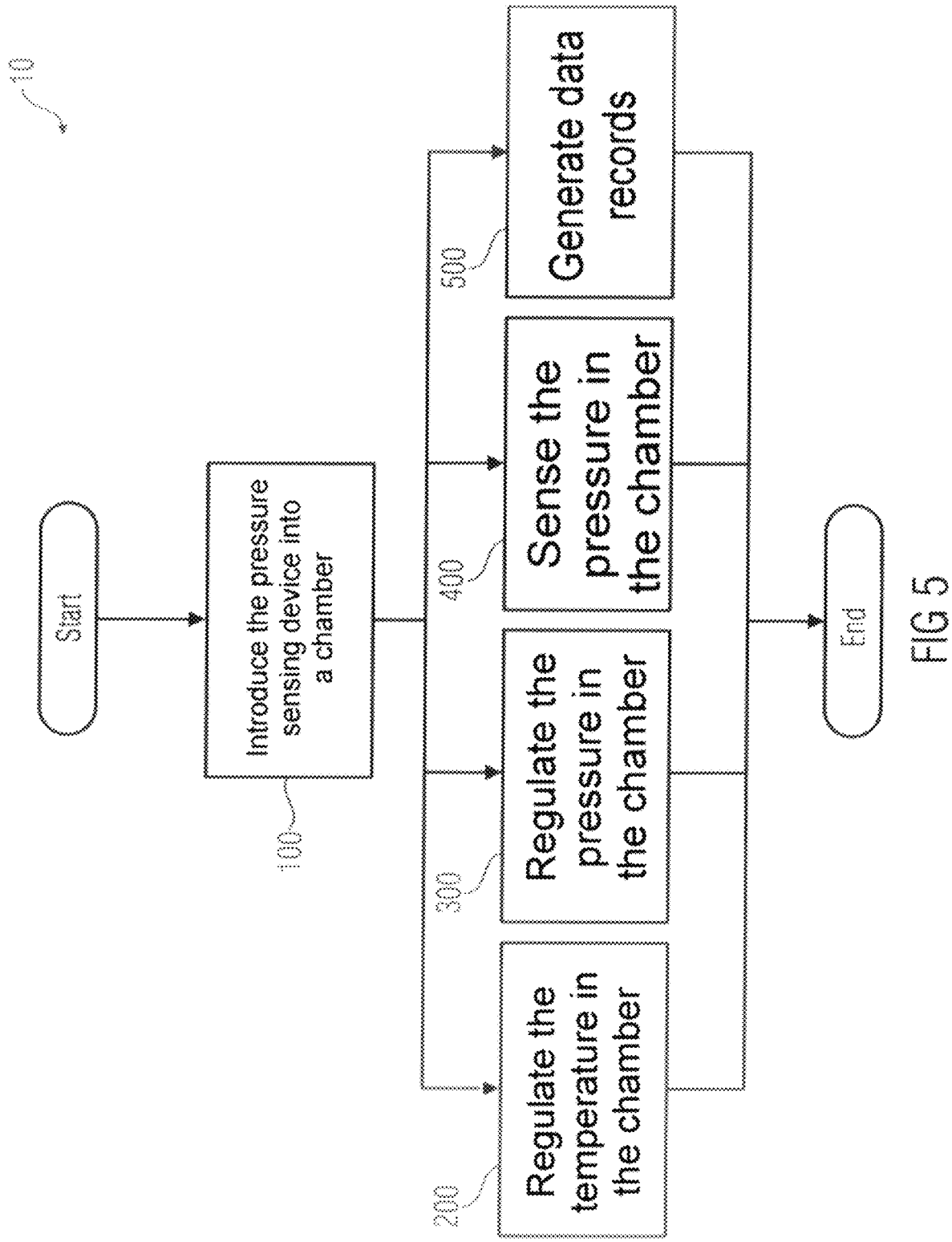
FIG. 5 shows an exemplary flowchart for illustrating a sequence of exemplary embodiments of a method according to the invention.

FIG. 5 shows an exemplary flowchart for illustrating a sequence of exemplary embodiments of a method 10 according to the invention. The method 10 is provided for the purpose of calibrating a pressure sensing device DE having a pressure sensor DS and a temperature compensation device TK.

The method 10 comprises: a first step 100: introducing the pressure sensing device DE into a chamber 2 for applying a variable temperature TE and a variable pressure DR to the pressure sensing device DE; a second step 200: regulating the temperature TE in the chamber 2 by a temperature regulation device 3, with the result that the temperature TE in the chamber 2 increases in a strictly monotonous manner or falls in a strictly monotonous manner during a time interval ZI; a third step 300: regulating the pressure DR in the chamber 2 by a pressure regulation device 4, with the result that the pressure DR in the chamber 2 respectively monotonously increases or respectively monotonously falls in the time interval ZI during a plurality of sub-intervals TI of the time interval ZI; a fourth step 400: sensing the pressure DR in the chamber during the time interval by a reference pressure sensor 5; and a fifth step 500: generating data records DA by a data record generation device 6, with the result that, for a plurality of discrete times ZP during the time interval ZI, a data record DA of the data records DA which is based on the respective discrete time ZP is respectively generated, which data record comprises a reference pressure value RDW generated by the reference pressure sensor 5, a pressure value DW determined by the pressure sensor DS and a temperature value TW determined by a temperature sensor TS of the temperature compensation device TK.

After the method 10 has been started, step 100 can be carried out first of all. After step wo has been concluded, steps 200, 300, 400 and 500 are carried out in a parallel manner. The method 10 can be ended when steps 200, 300, 400 and 500 have been executed.

Exemplary embodiments of the invention relate to a computer program for carrying out a method 10, as explained above, when it is executed on a computer or a processor.

Although specific exemplary embodiments of the invention are illustrated and described herein, it is clear to experts in the field of the invention that the specific exemplary embodiments illustrated and described can be replaced with a multiplicity of alternative and/or equivalent embodiments without departing from the subject matter of the present invention. This patent application intends to cover all adaptations or variations of the specific exemplary embodiments described. Therefore, provision is made for the invention to be restricted only by the subject matter of the accompanying claims and the equivalents thereof.

What is claimed is:

1. An apparatus for calibrating and/or testing a pressure sensing device having a pressure sensor and a temperature compensation device, wherein the apparatus comprises:
   a chamber for applying a variable temperature and a variable pressure to the pressure sensing device;
   a temperature regulation device for regulating the temperature in the chamber, which temperature regulation device is configured so that the temperature in the chamber respectively increases in a strictly monotonous manner between a first temperature and a second temperature or falls in a strictly monotonous manner between the second temperature and the first temperature during one or more time intervals, wherein the first temperature is different from the second temperature;
   a pressure regulation device for regulating the pressure in the chamber, which pressure regulation device is configured so that the pressure in the chamber respectively monotonously increases between a first pressure and a second pressure or respectively monotonously falls between the second pressure and the first pressure during each of a plurality of sub-intervals of the one or more time intervals, wherein the first pressure is different from the second pressure;
   a reference pressure sensor for sensing the pressure in the chamber during the one or more time intervals;
   a data record generation device for generating data records, which data record generation device is designed in such a manner that, for a plurality of discrete times during the one or more time intervals, a data record of the data records which is based on the respective discrete time is respectively generated, said data record comprising a reference pressure value generated by the reference pressure sensor, a pressure value determined by the pressure sensor and a temperature value determined by the temperature sensor of the temperature compensation device, wherein the data record generation device comprises a first compensation device having an input coupled to an output of the pressure regulation device, and a second compensation device having an input coupled to an output of the temperature regulation device; and
   a calibration data determination device having an input coupled to an output of the first compensation device and coupled to an output of the second compensation device, and an output coupled to the temperature compensation device.

2. The apparatus as claimed in claim 1, wherein the data record generation device is configured such that a plurality of the discrete times are respectively provided at least during some of the sub-intervals of the one or more time intervals.

3. The apparatus as claimed in claim 1, wherein the data record generation device is configured such that the discrete times are equidistant at least during the one or more time intervals.

4. The apparatus as claimed in claim 1, wherein the temperature regulation device is configured such that the temperature in the chamber alternately increases in a strictly monotonous manner and falls in a strictly monotonous manner in successive time intervals of the one or more time intervals.

5. The apparatus as claimed in claim 1, wherein the pressure regulation device is configured such that the pressure in the chamber alternately monotonously increases and monotonously falls at least during the one or more time intervals in successive sub-intervals of the sub-intervals.

6. The apparatus as claimed in claim 1, wherein the calibration data determination device is configured for determining calibration data for the temperature compensation device of the pressure sensing device using at least some of the data records.

7. The apparatus as claimed in claim 6, wherein the calibration data comprise calibration coefficients of a calibration polynomial for the temperature compensation device of the pressure sensing device.

8. The apparatus as claimed in claim 7, wherein the calibration polynomial is at least a third-order polynomial with respect to the pressure and is at least a third-order polynomial with respect to the temperature.

9. The apparatus as claimed in claim 6, wherein the calibration data determination device is configured to transmit the calibration data to the temperature compensation device of the pressure sensing device.

10. The apparatus as claimed in claim 6, wherein the calibration data determination device is configured to test the pressure sensing device on the basis of some of the data records which are not used when determining calibration data.

11. The apparatus as claimed in claim 1, wherein the first compensation device is configured for compensating for dynamic errors of the pressure sensor in order to thus reduce dynamic errors in the pressure values in the data records.

12. The apparatus as claimed in claim 11, wherein the second compensation device is configured for compensating for dynamic errors of the temperature sensor in order to thus reduce dynamic errors in the temperature values in the data records.

13. A method for calibrating a pressure sensing device having a pressure sensor and a temperature compensation device, wherein the method comprises:
   introducing the pressure sensing device into a chamber for applying a variable temperature and a variable pressure to the pressure sensing device;
   regulating the temperature in the chamber by a temperature regulation device, with the result that the temperature in the chamber increases in a strictly monotonous manner between a first temperature and a second temperature or falls in a strictly monotonous manner between the second temperature and the first temperature during a time interval, wherein the first temperature is different from the second temperature;
   regulating the pressure in the chamber by a pressure regulation device, with the result that the pressure in the chamber respectively monotonously increases between a first pressure and a second pressure or respectively monotonously falls between the second pressure and the first pressure in the time interval during each of a plurality of sub-intervals of the time interval, wherein the first pressure is different from the second pressure;

sensing the pressure in the chamber during the time interval by a reference pressure sensor; and generating data records by a data record generation device, with the result that, for a plurality of discrete times during the time interval, a data record of the data records which is based on the respective discrete time is respectively generated, which data record comprises a reference pressure value generated by the reference pressure sensor, a pressure value determined by the pressure sensor and a temperature value determined by a temperature sensor of the temperature compensation device.

14. A computer program for carrying out the method as claimed in claim 13 when it is executed on a computer or a processor.

15. A method for calibrating and/or testing a pressure sensing device having a pressure sensor and a temperature compensation device, wherein the method comprises:

in a chamber, applying a variable temperature and a variable pressure to the pressure sensing device;

regulating the temperature in the chamber, so that the temperature in the chamber respectively increases in a strictly monotonous manner between a first temperature and a second temperature or falls in a strictly monotonous manner between the second temperature and the first temperature during one or more time intervals, wherein the first temperature is different from the second temperature;

regulating the pressure in the chamber, so that the pressure in the chamber respectively monotonously increases between a first pressure and a second pressure or respectively monotonously falls between the second pressure and the first pressure during each of a plurality of sub-intervals of the one or more time intervals, wherein the first pressure is different from the second pressure;

sensing the pressure in the chamber during the one or more time intervals; and generating data records, which data record generation device is designed in such a manner that, for a plurality of discrete times during the one or more time intervals, a data record of the data records which is based on the respective discrete time is respectively generated, said data record comprising a reference pressure value, a pressure value determined by the pressure sensor and a temperature value determined by the temperature sensor of the temperature compensation device.

16. The method as claimed in claim 15, wherein a plurality of the discrete times are respectively provided at least during some of the sub-intervals of the one or more time intervals.

17. The method as claimed in claim 15, wherein the discrete times are equidistant at least during the one or more time intervals.

18. The method as claimed in claim 15, wherein the temperature in the chamber alternately increases in a strictly monotonous manner and falls in a strictly monotonous manner in successive time intervals of the one or more time intervals.

19. The method as claimed in claim 15, wherein the pressure in the chamber alternately monotonously increases and monotonously falls at least during the one or more time intervals in successive sub-intervals of the sub-intervals.

20. The method as claimed in claim 15, further comprising determining calibration data using at least some of the data records.

21. The method as claimed in claim 20, wherein the calibration data comprise calibration coefficients of a calibration polynomial.

22. The method as claimed in claim 21, wherein the calibration polynomial is at least a third-order polynomial with respect to the pressure and is at least a third-order polynomial with respect to the temperature.

23. The method as claimed in claim 20, further comprising transmitting the calibration data to the temperature compensation device of the pressure sensing device.

24. The method as claimed in claim 20, further comprising testing the pressure sensing device on the basis of some of the data records which are not used when determining calibration data.

25. The method as claimed in claim 15, further comprising compensating for dynamic errors of the pressure sensor in order to reduce dynamic errors in the pressure values in the data records.

26. The method as claimed in claim 25, further comprising compensating for dynamic errors of the temperature sensor in order to reduce dynamic errors in the temperature values in the data records.

* * * * *